3,007,949
PROCESS FOR THE PREPARATION OF
SUBSTITUTED PREGNANE-DIONES
Gérard Nominé, Noisy-le-Sec, Seine, and Daniel Bertin, Montrouge, Seine, France, assignors to Les Laboratoires Français de Chimiothérapie, Paris, France, a corporation of France
No Drawing. Filed Mar. 23, 1960, Ser. No. 16,920
Claims priority, application France Mar. 27, 1959
5 Claims. (Cl. 260—397.45)

The present invention relates to a process for producing 11α,17α-dihydroxy-16α-methyl-pregnane-3,20-dione starting with the corresponding 3α-acyloxy-16α,17α-epoxy-20-ethylene-dioxy-16β-methyl-pregnane-11-one, where acyl represents the acyl radical of an organic carboxylic acid having from one to eight carbon atoms.

In United States patent application Serial No. 2,115, filed January 13, 1960, in the name of one of us, Gérard Nominé, and commonly assigned, there is described a process for the preparation of pregnane-diones of the general formula

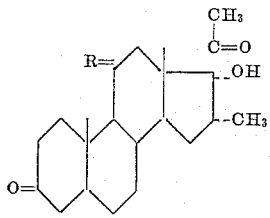

wherein

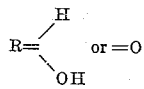

According to the process described in this application, Δ16-pregnane-3,11,20-trione is condensed with diazomethane. The pyrazoline obtained thereby is subjected to thermolysis to give 16-methyl-Δ16-pregnene-3,11,20-trione. The 3,20-diketal of this latter compound is prepared and reacted with the percarboxylic acid to form the 16,17-epoxide. Treatment of the 3,20-diketal of 16α,17α-epoxy-16β-methyl-pregnane-3,11,20-trione so produced with lithium in the presence of an aliphatic amine results in saponification of the epoxide function and simultaneous reduction and steric inversion of the 11-keto group. By acid cleavage of the 16α-methyl-17α-hydroxylated diketal obtained thereby, 11α,17α-dihydroxy-16α-methyl-pregnane-3,20-dione is obtained. This latter compound can be oxidized into 17α-hydroxy-16α-methyl-pregnane-3,11,20-trione.

The present invention has as an object the development of a very economical process for the preparation of this 11α,17α-dihydroxy-16α-methyl-pregnane-3,20-dione

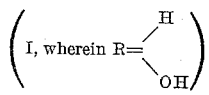

useful as an intermediate in the preparation of hexadecadrol (16α-methyl-9α-fluoro-prednisolone).

Another object of the invention is the obtention of the novel intermediates, 3α,11α,17α-trihydroxy-20-ethylene-dioxy-16α-methyl-pregnane and 3α,11α,17α-trihydroxy-16α-methyl-pregnane-20-one.

These and other objects of the invention will become more apparent as the description thereof proceeds.

We have found that 11α,17α-dihydroxy-16α-methyl-pregnane-3,20-dione can be obtained starting with 3α-acyl-oxy-16α,17α-epoxy-20-ethylenedioxy-16β-methyl-pregnane-11-one, where acyl represents the acyl radical of an organic carboxylic acid having one to eight carbon atoms, by a series of reactions the progression of which is shown in the schematic flow sheet of Table I.

TABLE I

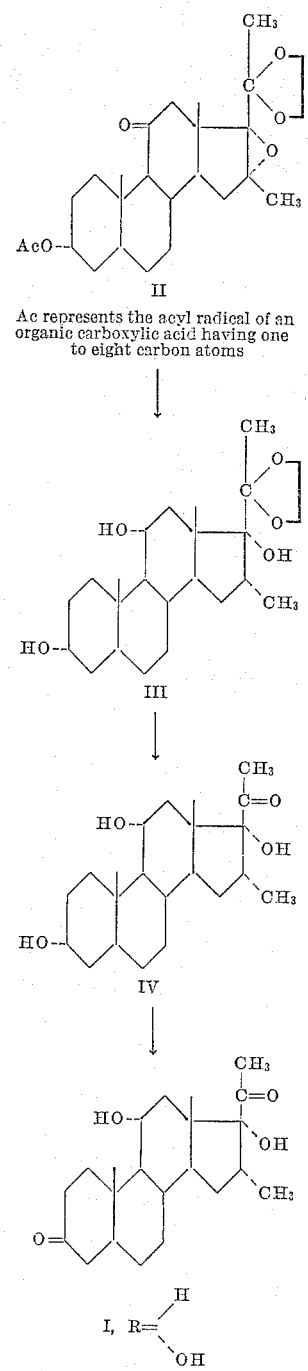

The series of reactions is effected in the following manner:

A 3α-acyloxy-16α,17α-epoxy-20-ethylenedioxy-16β-methyl-pregnane-11-one (II), where acyl represents the acyl radical of an organic carboxylic acid having one to eight carbon atoms, is subjected to the action of lithium in the presence of a lower alkylamine such as methylamine, at temperatures from −6° C. to −40° C., preferably at about −20° C., which yields, by simultaneously opening the epoxide ring in the 16,17-position with steric inversion, reducing the ketone function in the 11-position and saponifying the acyloxy function in the 3-position, the trihydroxylated compound, 3α,11α,17α-trihydroxy-20-ethylenedioxy-16α-methyl-pregnane (III) with practically quantitative yields due to the presence of the lower alkylamine such as methylamine. The hydrolysis of the 20-ethylenedioxy function of the triol III in an acid medium leads to 3α,11α,17α-trihydroxy-16α-methyl-pregnane-20-one (IV). This mono ketone IV is reacted with a selective oxidizing agent, an N-bromoamide or N-bromoimide such as N-bromo-succinimide in an aqueous, water-miscible organic solvent such as acetone at temperatures from about 0° C. to room temperature, in such a way as to convert the hydroxyl group in the 3-position into a keto group. The desired 11α,17α-dihydroxy-16α-methyl-pregnane-3,20-dione is then recovered. The invention also includes the intermediate products used in the present process for the preparation of 11α,17α-dihydroxy-16α-methyl-pregnane-3,20-dione, namely 3α,11α,17α-trihydroxy - 20 - ethylenedioxy-16α-methyl-pregnane and 3α,11α,17α-trihydroxy-16α-methyl-pregnane-20-one.

The 11α,17α-dihydroxy-16α-methyl-pregnane - 3,20-dione is useful as an intermediate in the preparation of the known hexadecadrol (16α-methyl-9α-fluoro-prednisolone). It can be transformed into 17α,21-dihydroxy-16α-methyl-Δ$^{9(11)}$-pregnene-3,20-dione by dehydration in the 9,11-position and microbiological hydroxylation in the 21-position, particularly by the enzymatic action of *Colletotrichum lindemuthianum* (ATCC 12611) as described in U.S. Patent No. 2,805,978, issued September 10, 1957. In addition, it can be acetyloxylated in the 21-position by known chemical means. The Δ$^{9(11)}$-pregnene-21-ol is acetylated in the 21-position in accordance with known processes, and then dehydrogenated, for example, by conventional microbiological procedures, to create double bonds in the 1,2 and 4,5-positions, thereby yielding 17α-hydroxy-21-acetoxy - 16α - methyl-Δ$^{1,4,9(11)}$-pregnatriene-3,20-dione (described by Oliveto et al., J. Am. Chem. Soc. 80, 4431 (1958)), which in turn is converted to hexadecadrol by formation of the fluorohydrin (the 9α-fluoro-11β-hydroxy derivative).

As a starting material for the process of the invention, 3α-acetoxy-16α,17α-epoxy-20-ethylenedioxy-16β - methyl-pregnane-11-one (II, where AcO=acetoxy) is conveniently used. This 3α-acetoxy compound is obtained according to the process described in U.S. patent application Serial No. 863,110, filed December 31, 1959, now Patent No. 2,945,029, in the name of one of us, Gérard Nominé, and commonly assigned, by reacting 3α-acetoxy-16-methyl-Δ$^{16}$-pregnene-11,20-dione (Oliveto, J. Am. Chem. Soc. 80, 4428 (1958)) with ethylene glycol in an anhydrous acid medium to obtain the 3α-acetoxy-20-ethylenedioxy-16-methyl-Δ$^{16}$-pregnene-11-one. The latter compound is treated in an inert organic solvent with a percarboxylic acid such as perphthalic acid and 3α-ocetoxy-16α,17α-epoxy-20-ethylenedioxy - 16β - methyl-pregnane-11-one is recovered.

Other starting 3α - acyloxy-16-methyl-Δ$^{16}$-pregnene-11,20-diones can be utilized in the above process to produce other 3α-acyloxy-16α,17α-epoxy-20-ethylenedioxy-16β-methyl-pregnane-11-ones. These other 3α-acyloxy compounds can be prepared by conventional methods such as saponification and re-esterification or ester interchange from the 3α-acetoxy compound. Any acyl radical derived from an organic carboxylic acid having from one to eight carbon atoms can be used, such as those derived from benzoic acid, acetic acid, propionic acid, cyclohexane carboxylic acid, etc.

While the process of the invention is described utilizing a 3α-acyloxy-16α,17α-epoxy-20-ethylenedioxy-16β-methyl-pregnane-11-one (II) as a starting material, any other 20-ketal can likewise be used in the process as the function of the ketal is to protect the 20-ketone function from undergoing reaction while reducing the 11-ketone function. The ketal prepared from ethylene glycol is preferred due to its ease of preparation.

The following example illustrates the invention without, however, limiting it. The temperatures are indicated in degrees centigrade.

EXAMPLE

*Preparation of 11α,17α-dihydroxy-16α-methyl-pregnane-3,20-dione*

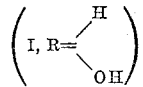

(a) 3α,11α,17α-TRIHYDROXY-20-ETHYLENEDIOXY-16α-METHYL-PREGNANE (III)

0.5 gm. of lithium are introduced, under agitation and in an atmosphere of nitrogen, at −20° C. into a mixture of 2 gm. of 3α-acetoxy-16α,17α-epoxy-20-ethylenedioxy-pregnane-11-one (II), and 60 cc. of methylamine. The steroid II is obtained starting with 3α-acetoxy-16-methyl-Δ$^{16}$-pregnene-11,20-dione, by preparing the corresponding 20-ethylene-ketal and reacting it with perphthalic acid. The reaction mixture is agitated at −20° C. for five hours, then 1 gm. of ammonium chloride is added. The methylamine is distilled off and the residue is taken up in 400 cc. of water. The aqueous mixture is neutralized to a pH of 7 by addition of acetic acid and extracted with ether. The extracts are combined and washed with water, with a solution of sodium bicarbonate, then again with water, dried over sodium sulfate and distilled to dryness. Yield: 1.76 gm. (97% of theory) of the product melting at 235° to 240° C. 3α,11α,17α - trihydroxy-20-ethylenedioxy - 16α - methyl-pregnane (III) obtained thereby is used without any further purification for the following stage of the synthesis. For analysis, the product is recrystallized from isopropyl ether and from methanol. The crystalline compound III has a melting point of 247 to 250° C. and a slow melting point of 240° C. with sublimation. It is very slightly soluble in water and soluble in ether.

*Analysis.*—Calculated: $C_{24}H_{40}O_5$; molecular weight= 408.56. C, 70.55%; H, 9.87%; O, 19.58%. Found: C, 70.3%; H, 9.8%; O, 20.3%.

This compound is not described in the literature.

(b) 3α,11α,17α-TRIHYDROXY-16α-METHYL-PREGNANE-20-ONE (IV)

1.75 gm. raw compound III, having a melting point of 235° to 240° C. prepared according to (a) above, are heated to 80° C. under an atmosphere of nitrogen in 17.5 cc. of 80% acetic acid. After an hour and a half of heating, the mixture is poured into a mixture of 150 cc. of water, 25 cc. of caustic soda and 100 gm. of ice. Compound IV precipitates. It is extracted with ether, the extracts are combined and washed with water, dried and distilled to dryness to recover 1.52 gm. of 3α,11α,17α-trihydroxy-16α-methyl-pregnane-20-one (IV) (98% of theory) melting at 195° to 199° C. By recrystallization from isopropyl ether, a product with a melting point of 210° to 211° C., a slow melting point of 172.5° to 175° C., and a specific rotation $[\alpha]_D^{20}=+33.8°$ (c=1% in ethanol), is obtained with a yield of 84%. Recrystallization from ethyl acetate and acetone does not change the melting point. The novel product IV is very slightly soluble in water; slightly soluble in isopropyl ether, acetone, benzene and chloroform; and soluble in alcohol and ethyl acetate.

*Analysis.*—$C_{22}H_{36}O_4$; molecular weight=364.51. Calculated: C, 72.49%; H, 9.96%. Found: C, 72.4%; H, 9.9%.

This compound is not described in the literature.

(c) 11α,17α-DIHYDROXY-16α-METHYL-PREGNANE-3,20-DIONE

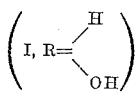

0.5 gm. of compound IV prepared according to (b) above is suspended in 10 cc. of an aqueous acetone solution containing 33% water. After cooling the suspension to +2° C., 0.58 gm. of N-bromo-succinimide is added. The reaction mixture is agitated for one-half hour at +20° C.; the product dissolves and the solution turns orange. After allowing it to stand for an hour and a half at +2° C., 3 drops of a saturated aqueous solution of sodium bisulfite are added until the solution becomes colorless. The acetone is distilled off in vacuo, the residue is taken up with 5 cc. cold water, compound I is separated on a vacuum filter, and the filter cake is washed with water and dried. Yield: 0.465 gm. (94% of theory) of 11α,17α-dihydroxy-16α-methyl-pregnane-3,20-dione melting at 192° C. The product is purified by recrystallization from ethyl acetate, yielding 0.370 gm. of a product melting at 198° C., which is identical in all respects to the product described in commonly assigned United States Patent application Serial No. 2,115, filed January 13, 1960.

The above example is non-limiting and it is evident that the temperatures and/or the solvents may be varied and that other equivalent techniques known to those in the art may be used without departing from the spirit of the invention. Thus it is possible to use other 3α-acyloxy derivatives in place of the 3α-acetoxy starting compound; to use other 20-ketals in place of the 20-ethylenedioxy starting compound; to use other N-bromoamides and N-bromoimides in place of N-bromo-succinimide; and to use other acids in place of acetic acid for the cleavage of the ketal. These and other expedients known to those skilled in the art may be employed without departing from the spirit of the invention or the scope of the appended claims.

We claim:

1. A process for the preparation of 11α,17α-dihydroxy-16α-methyl-pregnane-3,20-dione which comprises the steps of treating 3α-acyloxy-16α,17α-epoxy-20-ketal-16β-methyl-pregnane-11-one in a lower alkylamine with lithium at a temperature from −6° C. to −40° C., for a time sufficient simultaneously to effect an opening of the epoxide ring in the 16,17-position with steric inversion, reducing the ketone function and saponifying the acyloxy group, hydrolyzing the 3α,11α,17α-trihydroxy-20-ketal-16α-methyl-pregnane with an aqueous acid, treating the 3α,11α,17α-trihydroxy-16α-methyl-pregnane-20-one with an oxidizing agent selected from the group consisting of N-bromoamides and N-bromoimides in an aqueous, water-miscible organic solvent at temperatures from about 0° C. to room temperature for a time sufficient to oxidize the hydroxyl group in the 3-position and recovering said 11α,17α-dihydroxy-16α-methyl-pregnane-3,20-dione.

2. The process of claim 1 wherein the starting compound is 3α-acetoxy-16α,17α-epoxy-20-ethylenedioxy-16β-methyl-pregnane-11-one.

3. The process of claim 1 wherein said first treating step is effected in methylamine with lithium at a temperature of about −20° C.

4. The process of claim 1 wherein said hydrolyzing step is effected with aqueous acetic acid.

5. The process of claim 1 wherein said second treating step is effected with N-bromosuccinimide in acetone.

References Cited in the file of this patent

UNITED STATES PATENTS

| | | |
|---|---|---|
| 2,714,599 | Fonken et al. | Aug. 2, 1955 |
| 2,945,029 | Nomine | July 12, 1960 |

UNITED STATES PATENT OFFICE
CERTIFICATION OF CORRECTION

Patent No. 3,007,949     Gérard Nominé et al.     November 7, 1961

It is hereby certified that error appears in the above numbered patent requiring correction and that the said Letters Patent should read as corrected below.

Column 1, lines 22 to 30, the formula should appear as shown below instead of as in the patent:

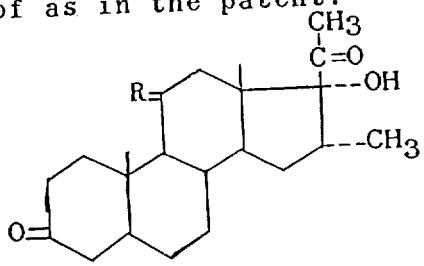

lines 56 to 60, the formula should appear as shown below instead of as in the patent:

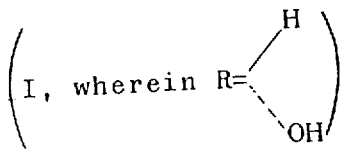

column 3, line 56, for "ocetoxy" read -- acetoxy --; column 4, lines 10 to 15, the formula should appear as shown below instead of as in the patent:

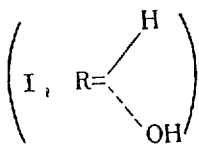

line 44, strike out, "Calculated:" and insert the same after "408.56.", line 45, same column 4; column 5, line 12, for "+20° C." read -- +2° C. --.

Signed and sealed this 1st day of May 1962.

(SEAL)
Attest:

ERNEST W. SWIDER
Attesting Officer

DAVID L. LADD
Commissioner of Patents